UNITED STATES PATENT OFFICE.

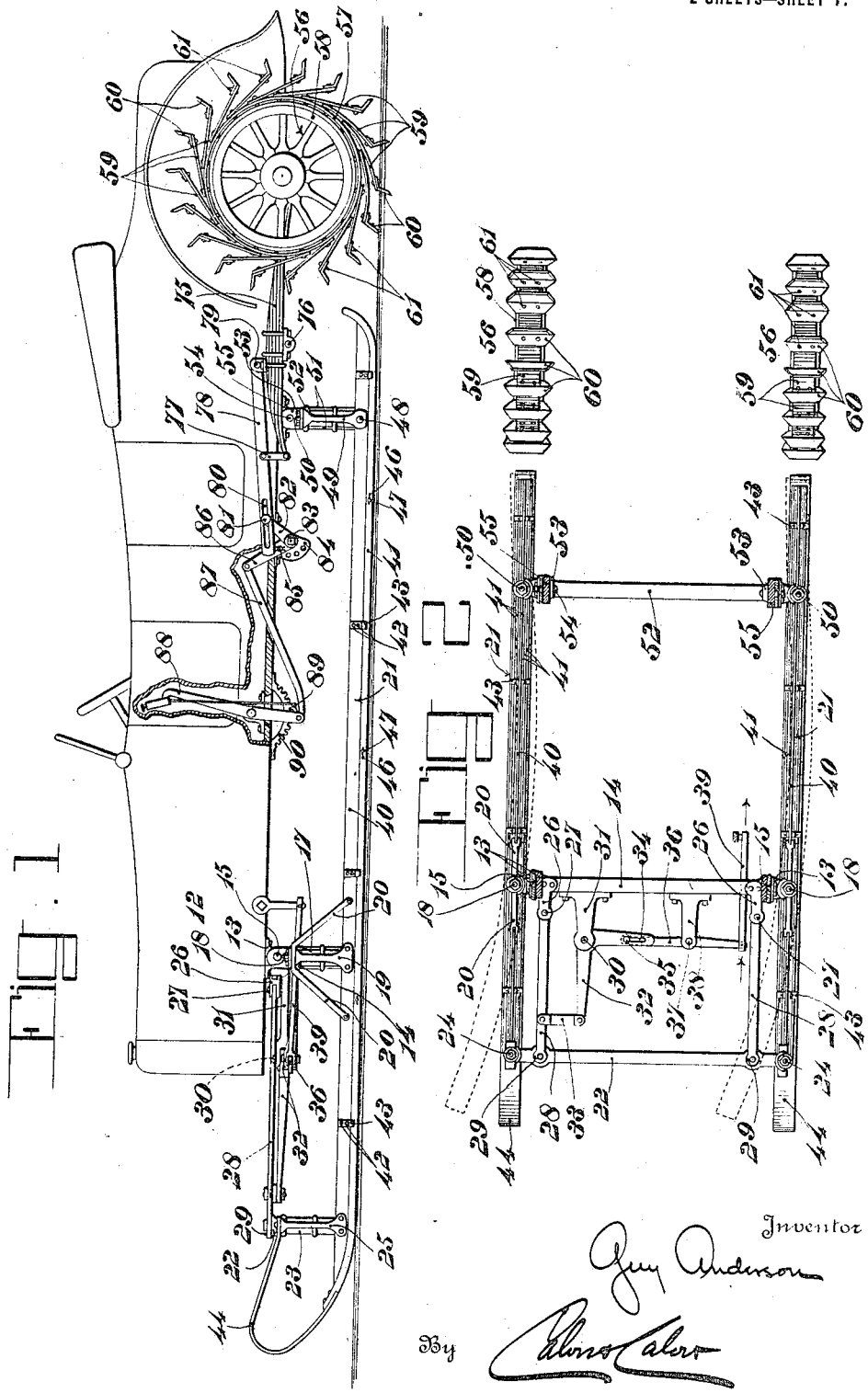

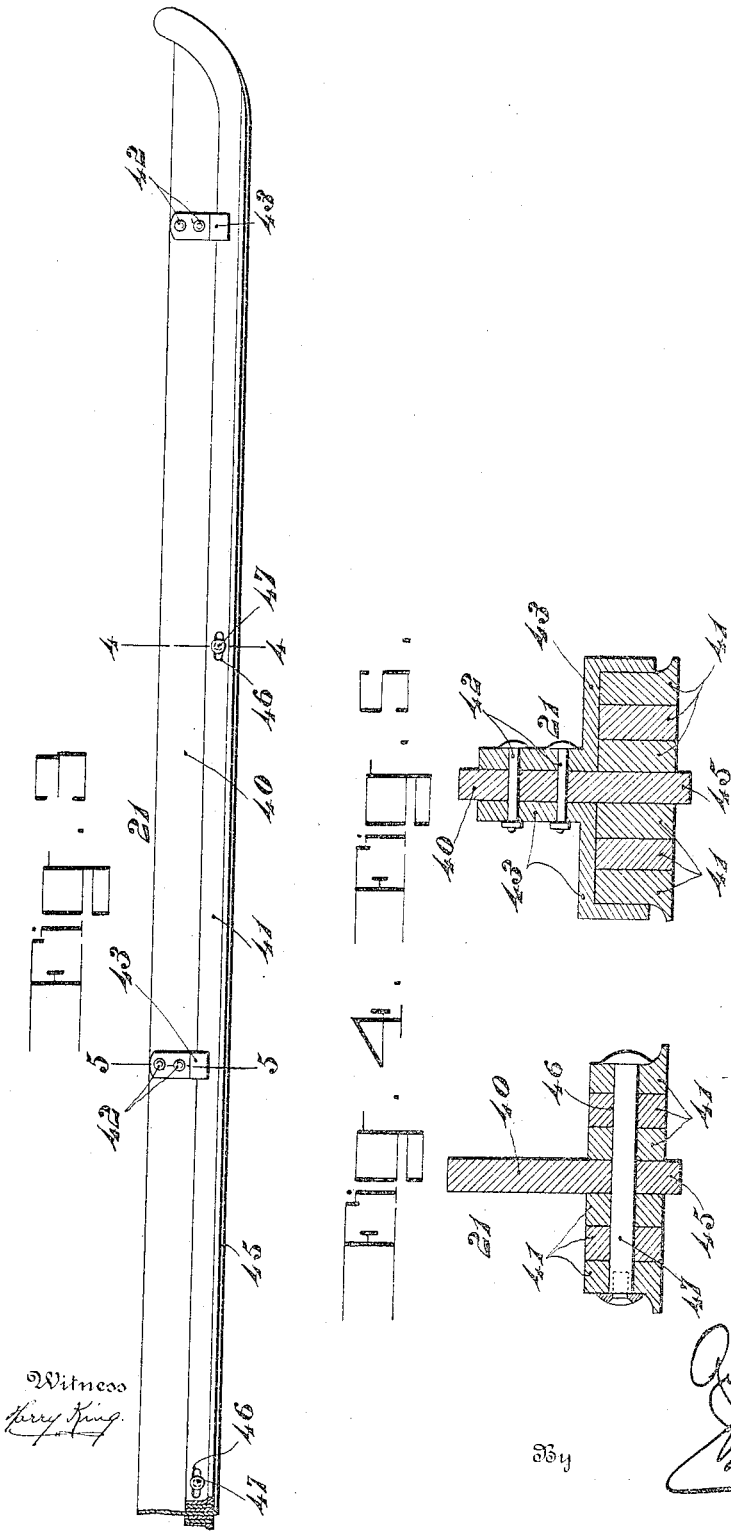

GUY ANDERSON, OF HAYNESVILLE, MAINE.

MOTOR-SLEIGH.

1,256,761.

Specification of Letters Patent.  Patented Feb. 19, 1918.

Application filed March 19, 1917. Serial No. 155,750.

*To all whom it may concern:*

Be it known that I, GUY ANDERSON, a citizen of the United States, residing at Haynesville, in the county of Aroostook and State of Maine, have invented or discovered certain new and useful Improvements in Motor-Sleighs, of which the following is a specification, reference being had therein to the accompanying drawings.

This invention relates to sleds and the like and has more particular reference to self-propelled vehicles of this character.

The invention has for its object the provision of a non-skidding sled runner for automobiles and similar vehicles having a sufficiently broad bearing face to enable the same to run over soft snow without objectionable cutting, and being of a sufficient length to properly support the weight of the vehicle and insure easy propulsion and comfortable riding, which runner may be simultaneously turned and laterally flexed substantially throughout its length, by means of suitable steering mechanism, whereby the vehicle may be efficiently steered.

The foregoing and other objects of the invention, together with means whereby the same may be carried into effect, will best be understood from the following description of certain forms or embodiments thereof illustrated in the accompanying drawings. It will be understood, however, that the particular constructions described and shown have been chosen for illustrative purposes merely and that the invention, as defined by the claims hereunto appended, may be otherwise practised without departing from the spirit and scope thereof.

In said drawings:

Figure 1 is a side elevation of a complete vehicle embodying the invention.

Fig. 2 is a plan view of the runners, steering devices, and traction wheels.

Fig. 3 is an enlarged side elevation of a portion of one of the runners.

Figs. 4 and 5 are sections on the lines 4—4 and 5—5, respectively, Fig. 3

In Fig. 1, 12 denotes the combined body and frame of the vehicle as a whole. 13 denotes brackets bolted or otherwise secured to suitable portions of the frame, adjacent opposite sides of the latter, said brackets having ears which support a transverse bar 14 by means of pivot bolts 15 passing through said ears and other ears on the bar 14. At its opposite ends the bar 14 is provided with depending arms or steering knuckles 17 to which are pivoted, by bolts or pins 18, runner knees or uprights each comprising a knuckle bracket 19 and a pair of braces 20, said bracket and braces being bolted or otherwise secured at their lower ends to the runners, which are designated as a whole by the numeral 21.

As shown in Fig. 2, two parallel runners are provided, said runners being connected, adjacent their forward ends, by a bar 22 having at its ends depending arms or knuckles 23 to which are pivoted, by means of bolts or pins 24, upright arms or brackets 25 bolted or otherwise secured at their lower ends to the runners 21. Carried by the bar 14, adjacent the ends thereof, and extending forwardly therefrom, are brackets 26 to the forward ends of which are pivoted, at 27, the rear ends of arms 28 pivoted at their forward ends 29 to the bar 22 adjacent the ends of the latter. Pivoted at 30 to a bracket 31 secured to the bar 14 is a bell crank lever 32, one arm of which is connected by a link 33 to one of the arms 28. The other arm of the lever 32 is provided with a slot 34 which receives a pin 35 carried by one arm of a lever 36 pivoted at 37 to a bracket 38 carried by the bar 14, the other end of said lever 36 being connected with a rod 39 forming a portion of the regular steering mechanism of the car.

Referring particularly to Figs. 3 to 5, each of the runners 21 comprises a supporting member 40, to which the lower ends of the brackets 19 and 25 and braces 20 are secured, and a series of flat, vertically disposed strips 41 preferably composed of spring steel and arranged side by side transversely of the runner and extending longitudinally thereof. The supporting member 40 comprises an upright strip, also preferably of spring steel, to which are secured, as by bolts 42, angular brackets 43 having portions which loosely embrace the strips 41, as shown in Fig. 5. The forward ends of the strips of each runner are slightly upturned and are riveted or otherwise secured to a strip 44 (see Fig. 1) which is curved upwardly and backwardly and secured to the corresponding arm or bracket 25, said strip constituting a runner nose. The strips 41 collectively provide a broad lower bearing face capable of running over soft snow without cutting into the same to an objectionable extent. The supporting member 40 preferably projects a short distance below the bearing face of the strips 41 to provide a substantially central fin or blade 45 adapted to cut into the snow or ice and resist lateral skidding. The strips 41 are provided intermediate the brackets 43 with longitudinal slots 46 which receive pins or bolts 47 passing also through the supporting member 40, whereby said strips are secured to said supporting member and to each other. By this construction independent longitudinal movement of the several strips 41 is permitted, so that the runner as a whole, notwithstanding its breadth, is rendered laterally flexible. By alternating the pins 47 and slots 46 with the brackets 43, which loosely embrace the strips 41, instead of passing said pins through said brackets, as described in my prior patent above referred to, and as shown at the right in Fig. 3, the construction is materially simplified, and the number of brackets, pins, and slots materially reduced.

The runners 21 extend backwardly throughout the greater portion of the length of the vehicle and are pivoted adjacent their rear ends, as at 48, to brackets or knuckles 49 connected by vertical pivots 50 with depending arms 51 on a transverse bar 52. The bar 52 is provided with ears 53 connected by pivot bolts 54 with ears 55 secured to the vehicle frame.

When the arms 28 are swung about the pivots 27 by the steering mechanism, the runners 21 are caused to swing, substantially in parallelism, about the pivots 18. Since the axes of the pivots 27 are located forward of the line connecting the axes of the pivots 18, the radius 27—29 is shorter than the radii 18—24. Swinging of the arms 28 on the pivots 27, therefore causes a shortening of the distance between the bars 13 and 22 by a greater amount than would normally be caused by the swinging of the runners 21 about their pivots 18, so that the distances between the pivots 18 and 24 are correspondingly shortened, and the runners caused to bend laterally between the pivots 18 and 24, as shown in dotted lines in Fig. 2. Moreover, since the rear ends of the runners 21 are held against any considerable lateral movement by the brackets or knuckles 49, turning of said runners upon their pivots 18 causes that portion of said runners intermediate the pivots 18 and 50 also to be flexed, as shown in dotted lines in Fig. 2. The vertical pivots 50 permit the knuckles 49 to turn to correspond to the angular position of the runners when the latter are bent, while the longitudinal shortening of the runners incidental to their bending is permitted by the horizontal pivots 48 and 54, which permit the knuckles 49 to swing forwardly and longitudinally of the runners, a sufficient distance to compensate for such shortening. In this manner it will be seen that, in the steering operation, the runners 21 are not only turned about the pivots 18, but are also laterally flexed at both sides of said pivots, or substantially throughout their lengths, thereby causing said runners to assume the form of substantially continuous curves, and greatly facilitating and increasing the efficiency of the steering operation.

The means for propelling the vehicle form no part of the present invention, but as herein shown the traction wheels 56 occupy the same position in the vehicle as the usual rear or driving wheels, and, in the case of a converted automobile of standard type, said traction or propelling wheels may comprise the regular rear wheels of the car with the tires removed and a suitable traction periphery substituted for each. As shown this periphery comprises a rim 57 secured to the felly 58 of the wheel and to which are secured, in substantially tangential position, a series of spring arms 59 provided at their ends with angular spurs 60 secured to the ends of the arms 59 by rivets or bolts 61.

In the construction shown the traction wheels 56 are carried at the ends of leaf or cantaliver springs 75 pivoted at 76 to the vehicle frame. Said springs are connected by links 77 to levers 78 pivoted at 79 to the vehicle frame. The levers 78 are provided with slots 80 which receive pins 81 on arms 82 fixed on a rock shaft 83 journaled in the vehicle frame and extending transversely thereof. Secured to the rock shaft 83 is a segment 84 provided with a series of openings adapted to receive a pin 85 passing through a lever or arm 86 loosely mounted on said rock shaft. The lever 86 is connected by a link 87 with a hand or other operating lever 88 arranged in convenient position adjacent to the driver's seat, said operating lever being preferably provided with a locking dog 89 coöperating with a locking segment 90. By operating the lever 88 the vertical position of the traction wheels with respect to the runners may be readily varied or adjusted at will in accordance with the relative hardness or softness of the surface over which the vehicle is traveling. The adjustable connection between the arm 86 and rock shaft 83 provided by the apertured segment 84 is for the purpose of increasing the range of operation of the adjusting mechanism.

Having thus described my invention I claim and desire to secure by Letters Patent:

1. In a sled or the like, the combination with a body and a laterally flexible runner pivoted at a plurality of points longitudinally thereof, said runner being longitudinally fixed with respect to said body at one of its pivots, of means operatively connecting said runner and body and fixed against a longitudinal movement with respect to said runner for simultaneously turning said runner on its pivots and laterally flexing the same.

2. In a sled or the like, the combination with a body and a laterally flexible runner pivoted at a plurality of points longitudinally thereof, said points being substantially fixed transversely of said body, and said runner being longitudinally fixed with respect to said body at one of said points, of means operatively connecting said runner and body and fixed against longitudinal movement with respect to said runner for simultaneously turning said runner on its pivots and laterally flexing the same.

3. In a sled or the like, the combination with a body and a laterally flexible runner pivoted at a plurality of points longitudinally thereof, said points being substantially fixed transversely of said body, and said runner being longitudinally fixed with respect to said body at one of said points and longitudinally movable with respect to said body at another of said points, of means operatively connecting said runner and body and fixed against longitudinal movement with respect to said runner for simultaneously turning said runner on its pivots and laterally flexing the same.

4. In a sled or the like, the combination with a body and a laterally flexible runner pivoted at a plurality of points longitudinally thereof, said runner being longitudinally fixed with respect to said body at one of its pivots, of a steering rod pivoted to said body to swing about a center in advance of said last-named runner pivot, and means for operatively connecting the forward ends of said runner and rod and for holding the same against relative longitudinal movement.

5. In a sled or the like, in combination, a body, a pair of laterally flexible runners, a pair of knuckles for pivotally connecting said runners and body, a second pair of knuckles pivotally connected to said body and to said runners, and steering means operatively connected with said runners.

6. In a sled or the like, in combination, a body, a pair of laterally flexible runners pivotally connected with said body, a pair of knuckles pivotally connected to said body and to said runners, and a steering rod pivotally connected to said body at a point out of alinement with the axes of said first-named runner pivots, and a steering bar pivotally connected with said runners and with said rod.

7. In a sled runner attachment for motor vehicles, in combination, a vehicle body, a pair of parallel, laterally flexible runners pivotally connected with said body, a bar pivotally connected at its ends to said runners, respectively, a pair of arms pivoted to said bar adjacent the ends thereof, said arms being pivotally connected with said body at points out of alinement with the runner pivots, a lever pivoted to said body, a link connecting said lever with one of said arms, a second lever having a slotted connection with said first named lever, and a steering rod operatively connected with said second lever.

8. In a sled runner attachment for motor vehicles, in combination, a vehicle body, a pair of parallel, laterally flexible runners pivotally connected with said body, a pair of knuckles pivotally connected to said body and to said runners, and a bar pivotally connected at its ends to said runners, respectively, a pair of arms pivoted to said bar adjacent the ends thereof, said arms being pivotally connected with said body at points out of alinement with the first-named runner pivots, a lever pivoted to said body, a link connecting said lever with one of said arms, a second lever having a slotted connection with said first-named lever, and a steering rod operatively connected with said second lever.

9. A sled runner comprising a longitudinally extending supporting member, a bearing member composed of a series of strips arranged side by side transversely of said runner and extending longitudinally thereof parallel to said supporting member, said strips having longitudinal slots, pins or bolts connecting said strips and passing through said slots, and brackets arranged intermediate said slots, said brackets being secured to said supporting member and loosely embracing said strips.

In testimony whereof I affix my signature.

GUY ANDERSON.

Copies of this patent may be obtained for five cents each, by addressing the "Commissioner of Patents, Washington, D. C."